Oct. 10, 1961 F. D. JOESTING 3,003,700
CONTROL APPARATUS
Filed Aug. 27, 1958
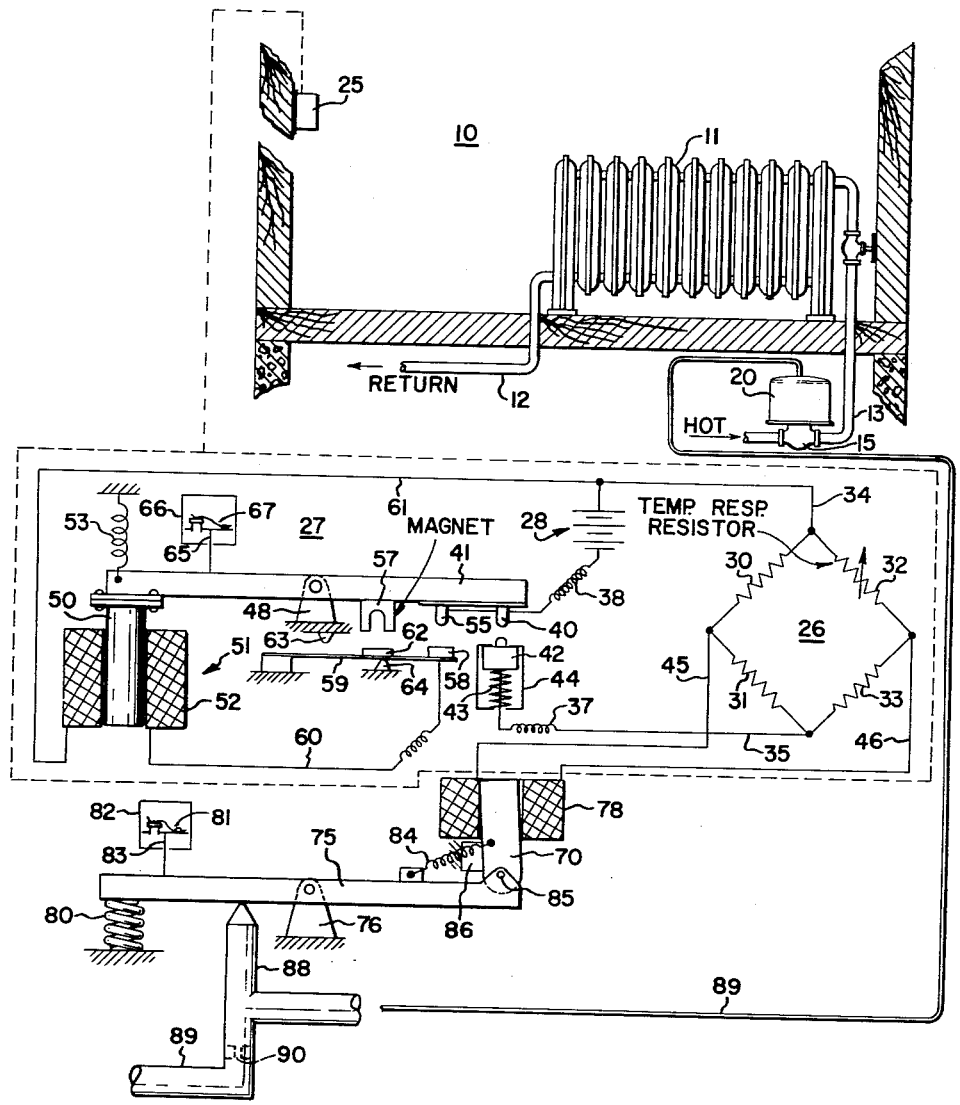
INVENTOR.
FREDERICK D. JOESTING
BY
Joseph E Ryan
ATTORNEY United States Patent Office 3,003,700
Patented Oct. 10, 1961

3,003,700
CONTROL APPARATUS
Frederick D. Joesting, Park Ridge, Ill., assignor to Minneapolis-Honeywell Regulator Company, Minneapolis, Minn., a corporation of Delaware
Filed Aug. 27, 1958, Ser. No. 757,530
7 Claims. (Cl. 236—36)

My invention is directed to an improved control apparatus and more particularly to an electro-pneumatic or electro-hydraulic control apparatus in which the primary electrical controller is periodically energized.

Control systems have been used in the past where the controlling source of power is of one type and the motive power or energy is of another type. They generally require complete well-established power sources such as electrical, pneumatic, or hydraulic with permanent installations to increase the cost of the system and decrease the mobility and simplicity of the same. Where battery power supplies have been utilized as a primary controlling power source they are generally expensive and short-lived and require much maintenance. Therefore the advantages obtained from the elimination of the cost of electrical power wiring are generally offset by the maintenance and the marginal operation factor of such a system. In the present invention, which utilizes a battery power supply for the electrical portion of the control network to provide flexibility in the system, periodic energization of the electrical circuit conserves on battery life and greatly simplifies the installation and wiring.

With this arrangement a low voltage output from the transducer to the pneumatic control circuit provides an arrangement in which the motivating pneumatic power source may be utilized in connection with an electrical control circuit without special installation and at greatly reduced cost. The invention is shown in connection with a temperature control system in which the primary controller is a thermostat which can have mounted with it the battery and periodic switching device to provide a very flexible and readily movable installation with only low voltage connections or leads to the main controlling apparatus.

It is therefore an object of this invention to provide an improved electro-pneumatic or hydraulic controlling system.

Another object of this invention is to provide in an improved electro-pneumatic or hydraulic control system the means for periodically energizing the electrical circuit and maintaining the effect of the electrical signal output during the de-energization of the electrical circuit.

A further object of this invention is to provide a simplified control system utilizing a self-contained electrical circuit through which a transducer is periodically energized to provide a simple and readily maintainable control circuit having a long life.

Still another object of this invention is to provide in an electro-pneumatic system of this type a periodic energizing arrangement to conserve on life of the energizing source.

These and other objects of this invention will become apparent from a reading of the attached description together with the drawing.

My invention is shown herein in the drawings in connection with a temperature controlling system but it should be recognized that any type of condition changing and controlling apparatus can be employed. As shown in the drawing, 10 indicates a space whose temperature is to be controlled by means of a heat exchanger or radiator indicated at 11 having connected thereto piping or conduits 12 and 13 leading to and from a source of heating or temperature changing medium such as steam or hot water, the source not being shown. The inlet conduit 13 includes a valve means indicated at 15 operated by a pneumatic actuator indicated schematically at 20. The operation of the valve is controlled by means of a condition responsive controller or thermostat indicated generally in the space at 25 and including a transducer 26, a periodic switching device 27 and a power source or battery 28 all of which are adapted to be included in the controller 25. Thus the dotted line leading from the box 25 and enclosing the transducer, switching device and power source indicates that this apparatus is contained therein. This type of arrangement is particularly useful where only a hydraulic or pneumatic control source is available and it is desired to use an electric circuit in connection with a primary controller. Further the use of low voltage wiring, as will be later seen, permits a much more simplified electrical circuitry. As shown herein the temperature responsive transducer 26 of the primary stat 25 is shown in the form of a Wheatstone bridge circuit including resistance elements 30, 31, 32, 33 of which 32 is indicated as variable and is made of a temperature responsive resistance material. The bridge circuit or transducer 26 has an input circuit or conductors 34, 35 connected thereto which lead to the battery source 28, the circuit including therewith a switching mechanism formed of a contact member 40 mounted on a pivoted lever 41 of the periodic switching device 27 and cooperating with a relatively stationary contact 42 which is slidably mounted within a bracket assembly 44 and biased through a spring 43 toward an extremity of the bracket 44 to provide for over-travel. The conductors 34, 35 associated with the contacts are made flexible to provide for relative movement of the contacts. With the switch elements 40, 42 closed, the battery 28 will supply current to the input circuit of the transducer. The transducer will become unbalanced due to variation of the variable resistance 32 from a predetermined value with temperature variation in the ambient temperature surrounding the same and an output will be obtained across an output circuit of the transducer indicated by conductors 45, 46 which is connected to a solenoid coil 78 to be later described in detail.

The periodic switching device 27 as indicated above includes the pivoted lever 41 which is pivoted as at 48 and carries at one extremity a plunger 50 of a solenoid actuator 51 whose coil 52 cooperates with a plunger to pivot the lever about a pivot 48 in one direction. A spring indicated at 53 is connected to the lever in such a manner as to urge the lever in an opposite direction of rotation against the operation of the solenoid 51. Also included in the periodic switching device 27 is a second set of contacts, one contact 55 of which is carried by the lever 41 and is connected in common with the contact 40 to cooperate with a second contact 58 mounted on a flexible spring blade 59 which is secured to the base of the switching device (not shown). Blade 59 is disposed between a pair of stop members 63, 64 and carries a magnetic armature 62 which is positioned thereon to cooperate with and be attracted to a permanent magnet 57 mounted on the lever 41. The flexible blade is biased against the stop 64 and as the pivoted lever 41 with magnet 57 thereon is rotated under influence of spring 53 toward contact 58, the blade 59 will be moved under the influence of the armature's attraction to the magnet 57 until the contacts 55, 58 engage. The contact 58 is connected through a conductor 60 with the one extremity of the coil 52 with the opposite extremity of the coil being connected through a conductor 61 to the battery 28. In addition the lever 41 has attached thereto a movable element 65 of a dash pot 66 to control the movement of the lever 41. The spring 53 is designed to urge the lever clockwise about its pivot 48 to engage the contacts 55, 58, and 40, 42 in the absence of energization of the solenoid. In this direction of motion the dash pot because of a directional check valve 67 in element 65 will tend to resist clockwise rotation of the lever and delay the movement caused by the spring force. Upon engagement of the contacts 55, 58 the solenoid 51 will be energized through a circuit which includes the battery source, the flexible conductor or portion 38 of the conductor 34, contact 55, contact 58, conductor 60, coil 52, and conductor 61 to the opposite side of the battery. The solenoid when energized will urge the lever 41 in a counterclockwise rotation against the force of the spring and against a smaller dash pot resistance. Thus the spring 53 is effective to rotate the lever 41 against the resistance of dash pot 66 in a clockwise direction as shown in the drawing to effect engagement of the contacts 40, 42, and 55, 58. The contacts 40, 42 will first engage setting up the energization circuit for the transducer 26 as described above. When the lever 41 has moved in this direction a sufficient distance to cause attraction between the magnet 57 and armature 62 on blade 59, the blade 59 will be rotated against its bias to cause engagement of the solenoid contacts 55, 58 in a snap action type of operation. The solenoid contacts will remain closed causing energization of the solenoid 51 in the manner described above until the solenoid pulls the lever 41 in a counter clockwise direction sufficiently for the spring blade 59 to engage the stop 63 and break the contacts 55, 58. Inertia developed in the solenoid lever will carry the lever as far as required and prior to the breaking of the contacts 55, 58, the transducer circuit will be broken by the disengagement of contacts 40, 42 when the contact element 42 reaches the top of is bracket 44. The ratio between the solenoid force, the dash pot and the spring are so adjusted that the energizing condition of the solenoid 51 takes place during a shortest interval of time and the action of the spring delayed by the dash pot 56 provides a relatively longer period or interval of de-energization or off period of the solenoid. With the closure of the contacts 40, 42 the energizing circuit for the transducer 26 is set up and with the bridge unbalanced, an output signal appears across the conductors 45, 46 which energizes the solenoid 78 having a plunger 70 cooperating therewith, and forming a part thereof.

The plunger 70 is pivotally mounted on one extremity of a second pivoted lever 75 which is pivoted at 76 and has a spring element 80 positioned at the opposite extremity urging the lever 75 in a clockwise direction against the counter-clockwise force developed by the solenoid 78. Also associated with the lever 75 is a dash pot 82 having a movable element 83 connected to the lever 75. Dash pot 82 includes a directional check valve 81 such that the unit damps movement of the element 83 directed inwardly of the dash pot. The plunger 70 of the solenoid is pivoted on the armature or lever 75 as at 85 and has a brake element 86 associated therewith and a spring means 84 connected between the lever and the plunger urging the plunger against the brake such that the lever will be held in whatever position it assumes upon energization of the solenoid. Associated with the lever 75 is a nozzle 88 which is connected to a pipe 89 through a restriction 90 adapted to be connected to a source of pneumatic pressure, not shown. The pipe 89 leads to the pneumatic actuator 20 for the valve 15 to control the operation of the valve. By varying the relative position between the lever and the nozzle 88 the pressure in the pipe 89 will be adjusted to operate the pneumatic motor 20 and hence the valve 15 in a modulating manner.

In operation, the cyclic or periodic operation of the switch 27 will energize and de-energize the transducer which responds to temperature in the space 10 in which it is positioned and will become unbalanced with a variation from a setting, that is the ambient temperature at which the bridge is balanced, to provide a signal output. Energization of the solenoid of the stat or controller associated therewith will cause the lever 75 to be pivoted varying the pressure at the nozzle 88 and hence in the pipe 89 to control the operation of the pneumatic motor 20 associated with valve 15. The dash pot 65 associated with the periodic switch device 27 includes a relief valve (not shown) to provide a relatively faster action in the downward direction under the influence of solenoid 51 and a considerably slower action or pivotal movement of the lever 41 associated therewith under the influence of the spring 53 in the absence of energization of the solenoid coil 52. The apparatus would normally be set for an on operation of from 1 to 5 seconds sufficient to allow for the temperature responsive bridge to provide an output and the stat associated therewith to reach a proper position to provide a control pressure in the pipe 89 proportional to variation of the ambient temperature in the space from the desired value. The off time of the switch would be adjusted to approximately 1 to 2 minutes or as long as possible to provide for satisfactory controls from the ultimate controller or actuator 20 of the valve 15 in the steam or heat lines 13 and 12 from the heat exchanger 11. This solenoid plunger 70 is pivoted slightly over center or off center and is held in position by the spring 84 associated therewith against the brake surface 86 opposing the effect of spring 80. Upon energization of the coil 78, the plunger will be centered allowing for free movement under the influence of the magnetic field control created by the coil 78 to move the armature to a desired position. The centering movement will move the plunger 70 away from the brake 86 allowing unrestricted movement of the plunger and hence the lever. The dash pot 82 associated with the lever damps movement of lever 75 and hence delays the movement of the lever with de-energization of the solenoid 78 and under the influence of the spring 80 until such time as the brake can be set to maintain the displaced position of the lever relative to the nozzle indicative of the new control pressure operating on the actuator 20.

It will be recognized that while the power control system is pneumatic it could be hydraulic or any other fluid medium. Similarly, the periodic switching device shown here as a solenoid and spring operating on a pivoted lever could be replaced with an equivalent electrical structure. In considering this invention, it should be kept in mind that the present disclosure is intended to be illustrative only and I wish to be limited only by the appended claims.

I claim:

1. In control apparatus, an electrical sensing means responsive to a condition and providing a signal output when energized in proportion to variation of the condition from a predetermined value, an electrical source of power, circuit means including a switching means and means for periodically operating said switching means connected to said electrical source and energized thereby for periodically connecting and disconnecting said electrical source to said sensing means to provide a periodic output therefrom in proportion to the variation of said condition from said predetermined value, and means connected to said sensing means and controlled by the signal output therefrom to operate in proportion to said output.

2. In control apparatus, an electrical sensing means responsive to a condition and providing a variable electrical signal output with variation in the magnitude of said condition, an electrical source of power, circuit means including a switching means and means for periodically operating said switching means connected to said electrical source and energized thereby for periodically connecting and disconnecting said electrical source to said sensing means to provide a periodic output therefrom in proportion to the variation of said condition, and means connected to said sensing means and controlled by the signal output therefrom to operate in proportion to said output.

3. In control apparatus, an electrical sensing means responsive to a condition and providing a signal output when energized in proportion to variation of the condition from a predetermined value, an electrical source of power, circuit means including a switching means and means for periodically operating said switching means connected to said electrical source and energized thereby for periodically connecting and disconnecting said electrical source to said sensing means to provide a periodic output therefrom in proportion to the variation of said condition from said predetermined value, means connected to said sensing means and controlled by the signal output therefrom to operate in proportion to said output, and means connected to the last named means and operative to maintain said last named means in its last operative condition when said sensing means is de-energized.

4. In a temperature control system for controlling the temperature of a space, a heat exchanger and a source of temperature changing medium connected thereto and positioned in said space, valve means for controlling the flow of temperature changing medium to said heat exchanger, a temperature responsive transducer including a bridge circuit having a temperature responsive resistance therein and an energizing source connected thereto, means including a periodic switching means connected to said energizing source for periodically connecting said energizing source to said transducer, output circuit means connected to said transducer and adapted to have a signal output impressed thereon in proportion to the variation in temperature of said space from a predetermined condition, an electro-pneumatic relay including a pivoted lever and a biasing means urging said lever in a predetermined direction, solenoid means including a pivoted plunger associated with said lever and urging said lever in opposition to said biasing means, a nozzle associated with said lever and connected to a source of pneumatic pressure, means connecting said nozzle means to said valve means to the same in accordance with the position of the said lever, means connecting said output circuit means from said transducer to said solenoid means to position said lever in accordance with the output of said transducer to vary the position of said lever with respect to said nozzle and hence control the operation of said valve means.

5. In a temperature control system for controlling the temperature of a space, a heat exchanger and a source of temperature changing medium connected thereto and positioned in said space, valve means for controlling the flow of the temperature changing medium to said heat exchanger, a temperature responsive transducer including a bridge circuit having a temperature responsive resistance therein and an energizing source connected thereto, means including a periodic switching means connected to said energizing source for periodically connecting said energizing source to said transducer, output circuit means connected to said transducer and adapted to have a signal output impressed thereon in proportion to the variation in temperature of said space from a predetermined condition, an electro-pneumatic relay including a pivoted lever and a biasing means urging said lever in a predetermined direction, solenoid means including a pivoted plunger associated with said lever and urging said lever in opposition to said biasing means, a nozzle associated with said lever and connected to a source of pneumatic pressure, means connecting said nozzle means to said valve means to operate the same in accordance with the position of the said lever, means connecting said output circuit means from said transducer to said solenoid means to position said lever in accordance with the output of said transducer and brake means associated with said pivoted plunger to maintain said lever in position determined by the energized solenoid upon de-energization of said solenoid.

6. In a temperature control system for controlling the temperature of a space, a heat exchanger and a source of temperature changing medium connected thereto and positioned in said space, valve means for controlling the flow of temperature changing medium to said heat exchanger, a temperature responsive transducer including a bridge circuit having a temperature responsive resistance therein and an energizing source connected thereto, means including a periodic switching means connected to said energizing means for periodically connecting said energizing means to said transducer, output circuit means connected to said transducer and adapted to have a signal output impressed thereon in proportion to the variation in temperature of said space from a predetermined condition, an electro-pneumatic relay including a pivoted lever and a biasing means urging said lever in a predetermined direction, solenoid means including a pivoted plunger associated with said lever and urging said lever in opposition to said biasing means, a nozzle associated with said lever and connected to a source of pneumatic pressure, means connecting said nozzle means to said valve means to control pressure at said valve means and hence the operation of the same in accordance with the position of the said lever, means connecting said output circuit means from said transducer to said solenoid means to position said lever in accordance with the output of said transducer and vary the position of said lever with respect to said nozzle to control the operation of said valve means, and means including a dash pot connected to said pivoted lever and a brake associated with said pivoted plunger to maintain said lever and hence said pressure on said valve in the condition determined by the output of said transducer during periods of de-energization of said transducer.

7. In a condition control system for controlling the condition of a space, a condition changing means and a source of condition changing medium connected thereto and positioned in said space, valve means for controlling the flow of condition changing medium to said condition changing means, a condition responsive transducer including a bridge having a condition responsive resistor therein and an energizing source connected thereto, means including a periodic switching means connected to said energizing means for periodically connecting said energizing means to said transducer, output circuit means connected to said transducer and adapted to have a signal output pressed thereon in proportion to the variation in condition of said space from a predetermined condition, an electro-pneumatic relay including a pivoted lever and a biasing means urging said lever in a predetermined direction, solenoid means including a pivoted plunger associated with said lever and urging said lever in opposition to said biasing means, a nozzle associated with said lever and connected to a source of pneumatic pressure, means connecting said nozzle means to said valve means to control pressure at said valve means and hence the operation of the same in accordance with the position of the said lever, means connecting said output circuit means from said transducer to said solenoid means to position said lever in accordance with the output of said transducer and means including a dash pot connected to said pivoted lever and a brake associated with said pivoted plunger to maintain said lever and hence said pressure on said valve in the condition determined by the output of said transducer during periods of de-energization of said transducer.

References Cited in the file of this patent

UNITED STATES PATENTS

| | | |
|---|---|---|
| 1,165,098 | Herr | Dec. 21, 1915 |
| 1,885,053 | Slough | Oct. 25, 1932 |
| 2,285,913 | Derrah | June 9, 1942 |
| 2,467,856 | Rich | Apr. 19, 1949 |
| 2,729,396 | Impey | Jan. 3, 1956 |
| 2,760,509 | Side | Aug. 28, 1956 |
| 2,765,415 | Ehret | Oct. 2, 1956 |